United States Patent [19]

Schnelle et al.

[11] Patent Number: 4,611,374
[45] Date of Patent: Sep. 16, 1986

[54] METHOD FOR MANUFACTURING A CHECK VALVE CONTAINED WITHIN A TUBE

[75] Inventors: Steven H. Schnelle, New Haven; Richard D. Wood, Columbia City; Charles E. Weicht, Huntington, all of Ind.

[73] Assignee: United Technologies Automotive, Inc., Dearborn, Mich.

[21] Appl. No.: 747,623

[22] Filed: Jun. 24, 1985

Related U.S. Application Data

[62] Division of Ser. No. 602,249, Apr. 20, 1984, abandoned.

[51] Int. Cl.$^4$ .................. B21D 53/00; B21D 39/00; B21D 41/00; B23P 15/00
[52] U.S. Cl. .................. 29/157.1 R; 29/283.5; 29/441 R; 29/445; 29/510; 29/515; 29/DIG. 105; 72/402; 137/515.5; 137/519.5; 137/533.11
[58] Field of Search .......... 29/157.1 R, 283.5, 441 R, 29/441 BP, 445, 510, 515, DIG. 105; 72/402; 137/515.5, 519.5, 528, 533.11, 539; 269/8

[56] References Cited

U.S. PATENT DOCUMENTS

| 1,381,463 | 6/1921 | Hotchkiss | 137/519.5 |
| 1,708,040 | 4/1929 | Zerk | 29/157.1 R |
| 2,069,153 | 1/1937 | Konkle | 29/157.1 R |
| 3,228,419 | 1/1966 | Smith et al. | 137/540 |
| 3,387,625 | 6/1968 | Laure | 137/539 X |
| 3,620,228 | 11/1971 | Schmid | 137/107 |
| 3,736,640 | 6/1973 | Freiheit | 29/157.1 R |
| 4,071,045 | 1/1978 | Brandt | 137/528 |

FOREIGN PATENT DOCUMENTS

| 1191240 | 4/1965 | Fed. Rep. of Germany | 137/533.11 |
| 819117 | 10/1937 | France | 137/519.5 |
| 5763 | 7/1980 | Japan | 137/513.5 |

Primary Examiner—Howard N. Goldberg
Assistant Examiner—R. S. Walla
Attorney, Agent, or Firm—Robert P. Hayter

[57] ABSTRACT

A check valve integral with the tube and the method of manufacturing a check valve are disclosed. The ball or poppet of the check valve is maintained in position via a magnetic mandrel while the tube is crimped at both sides of the poppet. The tube is inwardly crimped to prevent the poppet from being displaced in either direction and simultaneously to allow flow to bypass the poppet in the desired flow direction. Thereafter the poppet is physically displaced against one of the crimped indentations to coin a seat such that the poppet and the seat coact to prevent flow of fluid in the undesired direction. In this manner, a check valve is formed integrally with a tube without requiring any additional components.

6 Claims, 8 Drawing Figures

U.S. Patent   Sep. 16, 1986   Sheet 1 of 2   4,611,374
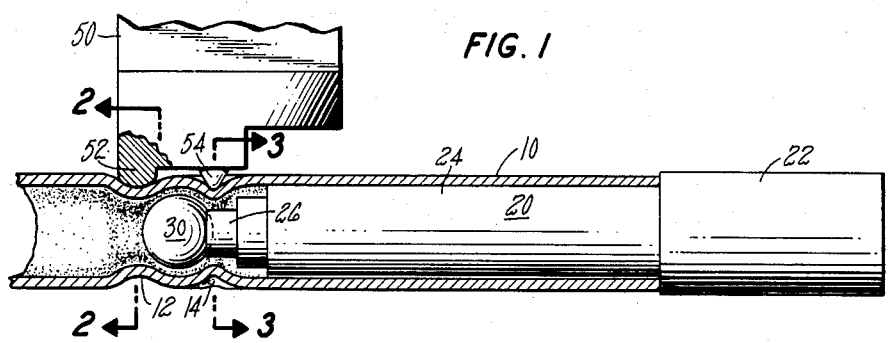
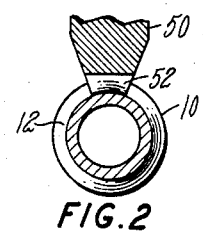
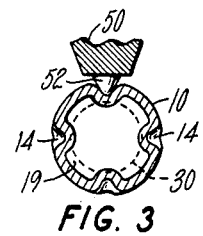
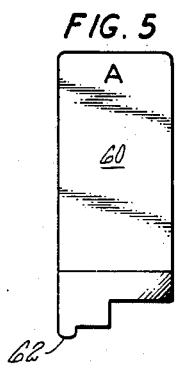
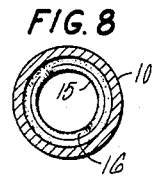
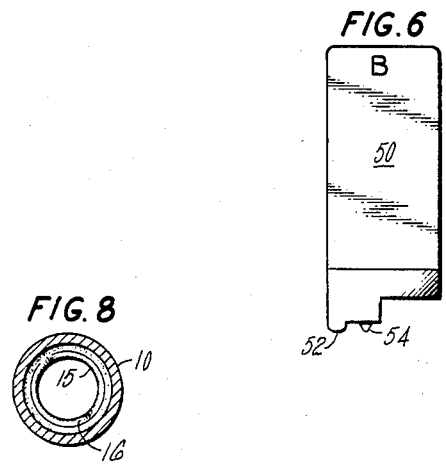
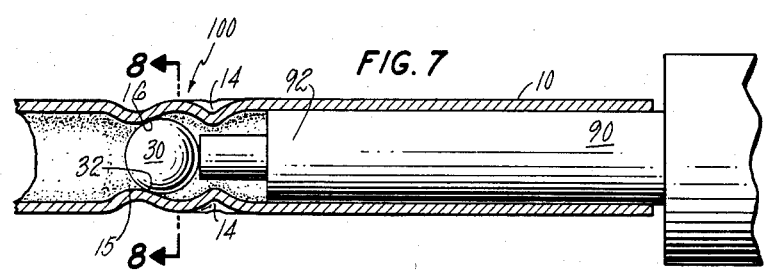

4,611,374

METHOD FOR MANUFACTURING A CHECK VALVE CONTAINED WITHIN A TUBE

This is a division of application Ser. No. 602,249 filed on Apr. 20, 1984, now abandoned.

BACKGROUND OF THE INVENTION

This invention relates to a ball-type check valve formed integrally with a tube and a method of manufacturing the check valve. More specifically, this invention concerns crimping the tube while a ball or poppet is secured in position to form a check valve integral with a tube.

In many applications it is desirable to incorporate a check valve in a fluid flow line to prevent fluid from flowing in one direction while allowing fluid to flow in the other direction. In those applications where a check valve may be incorporated directly in the fluid line, the necessity of using self-contained separate valve assemblies that must be joined in an appropriate manner to the tubing or pipe system is avoided. Additionally, by using an integral valve with tubing, if this tubing is a subassembly for a larger assembly then assembly time and labor required may be reduced since the subassembly including the tubing additionally incorporates the check valve. This eliminates the need to assemble a separate valve at the same time. Hence, both the material of the separate valve and the labor to install a separate check valve may be reduced by incorporating the check valve integrally with the tubing.

Heretofore, integrally assembled check valves have required a cage assembly and sealing means such that the ball of the check valve is maintained within the cage and the sealing means acts to secure the cage within the tube and secures the sealing means in the tube to prevent flow therebetween. The sealing means may additionally define a seat for the ball to provide a seal therebetween to prevent flow in the unwanted direction.

SUMMARY OF THE INVENTION

The invention described herein incorporates a poppet directly into a fluid conducting tube and repositions the wall of the tube to both retain the poppet in position and to provide a seal for effecting check valve operation. All this is accomplished without the use of any material other than the tube wall being appropriately deformed. No valve cage or other additional structures need be utilized. A simple insertion of the poppet itself and the subsequent deformation of the tube wall are all the components necessary to form the check valve.

One of the objects of the herein invention is to provide a check valve integral with a tube.

A further object of the present invention is to provide a simple, inexpensive check valve which may be incorporated integrally with a fluid-carrying tube.

A further object of the present invention is to provide a simple, economical method of manufacturing a check valve integral with a tube.

A still further object of the present invention is to provide a method of manufacturing a check valve including magnetically positioning a poppet and deforming the walls of the tube about the poppet to form the valve retaining surfaces.

It is a yet further object of the present invention to provide a safe, economical, reliable, and easy to manufacture check valve which is integral with a tube.

Other objects will be apparent from the description to follow and the appended claims.

The above objects are achieved according to the preferred embodiment by the provision of a check valve integral with a tube including a poppet secured within the tube by a seat indentation formed by displacing a circumferential portion of the tube radially inwardly and a retaining indentation including a series of spaced inwardly extending retaining indentations whereby the retaining indentations secure the poppet from displacement in one direction while allowing fluid flow around the poppet through the tube and the seat indentations secure the poppet from displacement in the opposite direction and together with the poppet substantially limit flow of the fluid in the opposite direction.

A method of making a check valve integral with a tube is further disclosed. The method includes the steps of positioning a poppet within the tube, crimping the tube on one side of the poppet to form a seat indentation for limiting motion of the poppet and crimping the tube on the other side of the poppet to form a retaining projection for limiting motion of the poppet without unduly limiting flow through the tube. The method further includes magnetically positioning the poppet before crimping occurs on either side of the poppet and subsequent coining of the seat for the poppet by striking the poppet with a punch to effectively displace a portion of the seat indentation to form a seat surface.

BRIEF DESCRIPTION OF THE DRAWINGS

FIG. 1 is a partially sectional view showing the tube with the poppet secured in position with the magnetic mandrel and the crimping finger located about the poppet.

FIG. 2 is a cross-sectional view of FIG. 1 at line 2—2.

FIG. 3 is a cross-sectional view of FIG. 1 at line 3—3.

FIG. 5 is an end view of crimper finger A.

FIG. 6 is an end view of crimper finger B.

FIG. 7 is a partially sectional view of check valve 100 with the poppet being forced against the seat indentation to coin the poppet seat.

FIG. 8 is a sectional view of a portion of FIG. 7 taken at line 8—8.

DESCRIPTION OF THE PREFERRED EMBODIMENT

Figure 4:
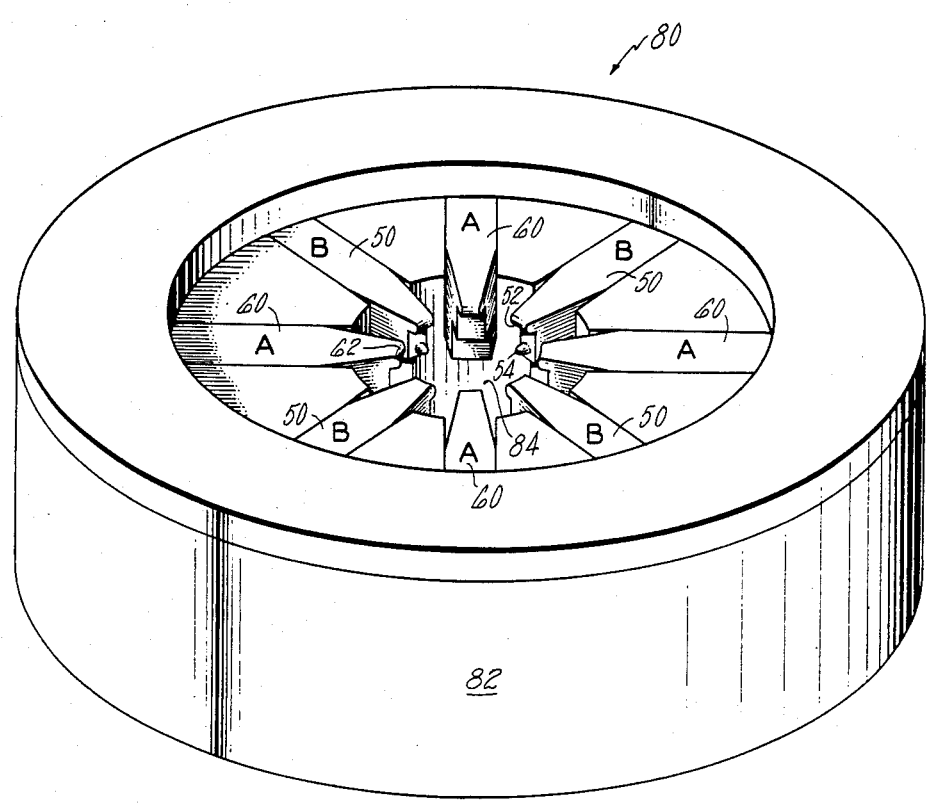
FIG. 4 is an isometric view of a radial crimper.

The check valve and method of manufacture thereof will be described with reference to the drawings herein. It is to be understood that this method and check valve may be utilized with additional components. For instance, a seal might be attached to the poppet before insertion within the tube and secured magnetically in place with the poppet prior to crimping such that a seal would be positioned within the tube. Additionally, the number and positioning of the fingers of the radial crimper are dependent upon the specific tube size and design involved. Furthermore, the poppet could be bullet-shaped or some other configuration capable of forming a seal with the seal surface.

Referring first to FIG. 1, there may be seen a tube 10 which initially is generally cylindrical in configuration. Inserted within tube 10 is magnetic mandrel 20 having base 22 which abuts against the end of tube 10. Magnetic mandrel 20 additionally includes extension 24 extending internally within the tube and having magnetic portion 26 attached to the end of extension 24. Poppet 30 which is a spherical member which serves to perform the checking function of the check valve is magnetically secured to the end of the magnetic mandrel in the desired position.

The entire assembly may then be located within the central opening of radial crimper 80 as is shown in FIG. 4. Central opening 84 is located at the center of the crimper such that a tube inserted therewithin may be engaged by various crimper fingers 50 and 60 and be displaced inwardly. Crimper finger B labeled 50 as shown in FIG. 1 is shown having a seat projection 52 and a retaining projection 54. It will be noted that seat projection 52 is generally rounded forming a rounded preseat indentation 12 in the tube when used to crimp the tube. Retaining projection 54 extending from finger B is generally pointed and forms a pointed retaining indentation 14 extending into the tube.

Additionally, as may be seen in FIG. 1, poppet 30 is prevented from displacement to the left by the preseat indentation 12 and from displacement to the right by retaining indentation 14.

Referring to FIGS. 2 and 3, which are sectional views of the tube taken at lines 2—2 and 3—3 of FIG. 1, the specific geometry of the tube may be seen. As shown in FIGS. 2 and 4, it may be seen that there are eight preseat indentations 12 spaced about the tube and extending inwardly therefrom. These projections are spaced circumferentially about the tube and act to define a generally inwardly extending radial surface.

On the other hand, the cross section taken at line 3—3 shows retaining indentations 14 which are spaced about the tube leaving an opening therebetween. Tube 10 is shown defining a bypass area 19 between inwardly extending retaining indentations 14. Poppet 30 has been shown via a dotted line to show its relative position such that it may be seen that when the poppet is displaced against the retaining indentations 14 bypass area 19 is formed to allow fluid flow to bypass the poppet and flow through the tube.

Referring specifically to FIG. 4 it may be seen that crimper 80 has a housing 82 and a series of crimper fingers 50 and 60 spaced for radial displacement within the housing. These crimper fingers are activated by an annular striker mechanism which rotates within the housing and forces the crimper fingers inwardly to provide the appropriate indentations in the tube surface. It will be additionally appreciated from FIG. 4 that fingers A and B referenced as fingers 60 and 50 respectively are spaced alternatingly about the radial crimper such that each finger is spaced from the other by the other type of finger. Finger A referenced by numeral 60 is shown in FIG. 5 and has but a single seat projection labeled 62 which is identical to seat projection 52 of finger B. Finger B as shown in FIG. 6 and labeled 50 includes, in addition to seat projection 52, retaining projection 54. Hence, as spaced about the radial crimper, it will be obvious that all eight fingers as shown include a seat projection labeled either 52 or 62 which acts to form the seat indentation at all eight locations as shown in cross section of FIG. 2. On the other hand, the retaining projection 54 is located only on the alternating finger B referenced by numeral 50 such that the retaining indentations are formed only by every other finger and hence there are only four retaining indentations spaced about the tube as may be seen in FIG. 3. Additionally, these indentations are more pointed and are spaced apart to define bypass area 19.

Once the tube has been crimped in the manner indicated, the poppet is prevented from being displaced from its desired position. However, the preseat indentations 12 when coacting with the surface of poppet 30 are such that they do not substantially act to limit flow from right to left direction looking at FIG. 1. Referring now to FIG. 7, it may be seen that punch 90 is provided to effectively displace the poppet to the left forming a contact point 32 between the poppet and the preseat indentation to define a seat indentation 15 having a seat surface 16. By the physical displacement of the poppet into the preseat indentation, the indentation is deformed into seat indentation 15 defining a seat surface 16. Seat surface 16 acts to engage the exterior surface of poppet 30 at contact point 32 to define a seal therebetween for substantially limiting flow from the right to left direction as shown. Punch 90 includes an extension 92 which physically contacts the poppet to effect displacement.

FIG. 8 is a cross-sectional view taken along line 8—8 in FIG. 7 and shows the relationship between the components. It may be seen therein that seat indentation 15 still extends slightly inwardly from seat surface 16. However, it is seat surface 16 which coacts with the exterior surface of the poppet to define the seal therebetween.

The tube and poppet assembly shown in FIG. 7 is labeled as check valve 100. This is the final assembly wherein the retaining projection is formed to prevent displacement of the poppet to the right while allowing flow of fluid through the tube to the right and wherein seat surface 16 prevents displacement of the poppet to the left and upon fluid flow being in the right to left direction acts to provide a seal surface which mates with the poppet to substantially limit fluid flow from the right to the left.

The invention has been described with reference to a particular embodiment and a particular method of manufacture. It is to be understood by those skilled in the art that variations and modifications can be effected within the spirit and scope of the invention.

We claim:

1. A method of making a check valve integral with a tube which comprises the steps of:
   positioning a poppet within the tube;
   crimping the tube on one side of the poppet to form a seat indentation for limiting motion of the poppet;
   crimping the tube on the other side of the poppet to form a retaining projection for limiting motion of the poppet without unduly limiting flow through the tube; and
   wherein the steps of crimping the tube on one side of the poppet and crimping the tube on the other side of the poppet occur substantially simultaneously with the poppet positioned within the tube.

2. The method as set forth in claim 1 and further comprising the step of coining a poppet seat on the seat indentation by forcing the poppet into the seat indentation to partially deform said indentation to provide a seat surface thereon.

3. The method as set forth in claim 2 wherein the step of coining includes inserting a punch into the tube in engagement with the poppet and striking the punch to displace the poppet into the seat indentation.

4. The method as set forth in claim 1 wherein both steps of crimping further comprise locating fingers having projections to effect crimping in a radial crimper and inserting the tube to be crimped within the crimper, said fingers including a first finger having both a seat projection and a retaining projection and a second finger having only a seat projection, said fingers being arranged in an alternating relationship such that upon crimping each finger forms a seat indentation in the tube and only the second fingers form a retaining projection.

5. The method as set forth in claim 4 wherein the steps of crimping further comprise the steps of forming the seat indentation using seat projections which form a rounded indentation mating with the adjacent indentation and using retaining projections which form a pointed retaining indentation spaced from the adjacent retaining indentation.

6. The method as set forth in claim 1 wherein the step of positioning the poppet includes inserting a magnetized mandrel with the poppet magnetically secured thereto into the tube such that the tube may be crimped on both sides of the poppet.

* * * * *